US012737657B2

(12) United States Patent
Debnath et al.

(10) Patent No.: US 12,737,657 B2
(45) Date of Patent: Sep. 15, 2026

(54) MULTI-QUBIT CONTROL WITH ACOUSTO-OPTIC MODULATORS

(71) Applicants: University of Maryland, College Park, College Park, MD (US); IonQ, Inc., College Park, MD (US)

(72) Inventors: Shantanu Debnath, College Park, MD (US); Norbert M. Linke, Stevenson, MD (US); Christopher R. Monroe, Columbia, MD (US); Caroline Figgatt, Denver, CO (US)

(73) Assignees: University of Maryland, College Park, College Park, MD (US); IonQ, Inc., College Park, MD (US)

( * ) Notice: Subject to any disclaimer, the term of this patent is extended or adjusted under 35 U.S.C. 154(b) by 957 days.

(21) Appl. No.: 17/969,258

(22) Filed: Oct. 19, 2022

(65) Prior Publication Data

US 2023/0162074 A1 May 25, 2023

Related U.S. Application Data

(63) Continuation of application No. 16/514,099, filed on Jul. 17, 2019, now Pat. No. 11,556,829.

(Continued)

(51) Int. Cl.
*G06N 10/40* (2022.01)
*G02F 1/11* (2006.01)

(Continued)

(52) U.S. Cl.
CPC ............ *G06N 10/40* (2022.01); *G02F 1/113* (2013.01); *G02F 1/116* (2013.01); *G02F 1/33* (2013.01);

(Continued)

(58) Field of Classification Search
CPC ........ G06N 10/40; G06N 10/70; G06N 10/00; G02F 1/113; G02F 1/116; G02F 1/332; G02F 3/00; G02F 1/33
See application file for complete search history.

(56) References Cited

U.S. PATENT DOCUMENTS 9,934,469 B1 4/2018 Jau et al.
2018/0120599 A1 5/2018 Morse et al.

(Continued)

FOREIGN PATENT DOCUMENTS

CN 1603984 A 4/2005
JP 2005331592 A 12/2005

OTHER PUBLICATIONS

Manning et al., NPL ("Quantum Information Processing With Trapped Ion Chains" Published 2014 By University of Maryland Department of Physics and National Institute of Standards and Technology total 171 Pages (Year: 2014).*

(Continued)

*Primary Examiner* — Quoc A Tran
(74) *Attorney, Agent, or Firm* — ARENTFOX SCHIFF LLP

(57) ABSTRACT

Aspects of the present disclosure describe techniques for controlling quantum states of ions in an ion chain for a quantum operation. For example, a method is described that includes providing, from a first direction, a global optical beam to the ions in the ion chain, and providing, from a second direction different from the first direction, to each ion in a subset of the ions in the ion chain, a respective addressing optical beam. The method further includes dynamically controlling each of the addressing optical beams being provided by using a respective channel in a multi-channel acousto-optic modulator (AOM) to implement, with the ion chain, one or more quantum gates in a sequence of quantum gates of the quantum operation.

(Continued)

Aspects of a quantum information processing (QIP) system that includes the multi-channel AOM for performing the method are also described.

20 Claims, 11 Drawing Sheets

Related U.S. Application Data

(60) Provisional application No. 62/701,128, filed on Jul. 20, 2018.

(51) Int. Cl.
*G02F 1/33* (2006.01)
*G02F 3/00* (2006.01)
*G06N 10/00* (2022.01)
*G06N 10/70* (2022.01)

(52) U.S. Cl.
CPC ................ *G02F 1/332* (2013.01); *G02F 3/00* (2013.01); *G06N 10/00* (2019.01); *G06N 10/70* (2022.01)

(56) References Cited

U.S. PATENT DOCUMENTS

2018/0299745 A1* 10/2018 Morse .................... G02F 1/113
2020/0185120 A1 6/2020 Keesling Contreras et al.

OTHER PUBLICATIONS

Denath et al., NPL ("A Programmable Five Qubit Quantum Computer Using Trapped Atomic Ions" Published 2016 By University of Maryland Department of Physics and National Institute of Standards and Technology and ProQuest total 24 Pages (Year: 2016).*
Bachor, P., et al. "Addressing single trapped ions for Rydeberg quantum logic." Journal of Physics B: Atomic, Molecular and Optical Physics 49.15 (2016) (Year: 2016).
Debnath, Shantanu, et al. "Demonstration of a small programmable quantum computer with atomic qubits." Nature 636.7614 (2016) (Year: 2016).
Linke, Norbert M., et al. "Experimental comparison of two-quantum computing architectures." Proceedings of the National Academy of Sciences 114.13 (2017): 3305-331. (Year: 2017).
Hess, P. W. et al., "Non-thermalization in trapped atomic ion spin chains." Philosophical Transactions of the Royal Society A: Mathematical, Physical and Engineering Sciences 375.2108 (2017): 20170107. (Year: 2017).
International Preliminary Report on Patentability for PCT/US2019/042414, dated Sep. 7, 2020, 19 pages.
International Search Report and Written Opinion corresponding to International Application No. PCT/US2019/042414, dated Oct. 29, 2019.
Figgatt, Caroline Margarett, "Building and Programming a Universal Ion Trap Quantum Computer", Digital Repository at the University of Maryland, Jul. 17, 2018 [URL: https://drum.lib.umd.edu/handle/1903/21008?show=full].
Schafer, V.M., et al., "Fast Quantum logic gates with trapped-ion qubits", Nature, vol. 555, No. 7694, Mar. 1, 2018, pp. 75-78.
Debnath, S. et al., "Observation of Hopping and Blockade of Bosons in a Trapped Ion Spin Chain", Cornell University, [URL:https://arxiv.org/pdf/1711.00216v1.pdf], Nov. 1, 2017.
Simon Theissing: "Email exchange with the University of Maryland for establishing the publication date of D1", May 17, 2024, 2 pages.
"Building and Programming a Universal Ion Trap Quantum Computer-Meta Information", May 17, 2024, pp. 1-2.
Communication pursuant to Article 94(3) EPC issued in European Application No. 19749088.1, dated, May 23, 2024, 10 pages.
Office Action in JP2021502748, mailed Jun. 13, 2023, 6 pages.

* cited by examiner

MULTI-QUBIT CONTROL WITH ACOUSTO-OPTIC MODULATORS

CROSS REFERENCE TO RELATED APPLICATION

The present application is a continuation of U.S. patent application Ser. No. 16/514,099, filed Jul. 17, 2019, which claims priority to and the benefit from U.S. Provisional Patent Application No. 62/701,128, filed on Jul. 20, 2018, both entitled "MULTI-QUBIT CONTROL WITH ACOUSTO-OPTIC MODULATORS," the contents of each of which are incorporated herein by reference in their entirety.

GOVERNMENT LICENSE RIGHTS

This invention was made with government support under Award No. W911NF1610082 by IARPA. The government has certain rights in the invention.

BACKGROUND

Aspects of the present disclosure relate generally to controlling the states of quantum bits (qubits) using counter-propagating optical beams.

Trapped atoms are one of the leading implementations for quantum information processing. Atomic-based qubits can be used as quantum memories, as quantum gates in quantum computers and simulators, and can act as nodes for quantum communication networks. Qubits based on trapped atomic ions enjoy a rare combination of attributes. For example, qubits based on trapped atomic ions have very good coherence properties, can be prepared and measured with nearly 100% efficiency, and are readily entangled with each other by modulating their Coulomb interaction with suitable external control fields such as optical or microwave fields. These attributes make atomic-based qubits attractive for extended quantum operations such as quantum computations or quantum simulations that could potentially have a long sequence of quantum circuits or quantum gates.

The accuracy of the states or the information in atomic-based qubits is important to avoid systematic errors that can accumulate during quantum operations and, therefore, it is desirable that techniques be developed to correct or adjust for these types of errors to reduce or eliminate their effects.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

A quantum information processor or quantum information processing (QIP) system that is based on multiple trapped ions (e.g., atomic quantum bits or qubits) may require independent control of each of the ions to achieve the flexibility to perform a complete set of universal quantum gates with significantly low overhead. Trapped atoms/ions can be manipulated using Raman transitions where the beatnote between two Raman beams (e.g., laser or optical beams) can coherently drive the internal qubit state. For controlling each trapped ion in a processor (e.g., in an ion trap used for processing quantum operations), an array of such Raman beams is used where each beam addresses a single ion. Using a multi-channel acousto-optic modulator (AOM) it is possible to control the phase, frequency, and/or amplitude of these Raman beams to implement independent universal control of each atomic qubit.

In an aspect of this disclosure, a method of controlling quantum states of ions in an ion chain for a quantum operation. The method includes providing, from a first direction, a global optical beam to the ions in the ion chain; providing, from a second direction opposite the first direction, to each ion in a subset of the ions in the ion chain, a respective addressing optical beam; and dynamically controlling each of the addressing optical beams being provided by using a respective channel in a multi-channel acousto-optic modulator (AOM) to implement, with the ion chain, one or more quantum gates in a sequence of quantum gates of the quantum operation.

In another aspect of this disclosure, a quantum information processing (QIP) system controlling quantum states of ions in an ion chain for a quantum operation. The QTP includes a trap configured to implement the ion chain; a first optical source configured to provide, from a first direction, a global optical beam to the ions in the ion chain; a set of second optical sources configured to provide, from a second direction opposite the first direction, to each ion in a subset of the ions in the ion chain, a respective addressing optical beam; a multi-channel acousto-optic modulator (AOM); and an optical controller configured to dynamically control the set of second optical sources to control each of the addressing optical beams being provided by using a respective channel in the multi-channel AOM to implement, with the ion chain, one or more quantum gates in a sequence of quantum gates of the quantum operation.

In yet another aspect of this disclosure, a computer-readable storage medium storing code with instructions executable by a processor is described for controlling quantum states of ions in an ion chain for a quantum operation.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1A:
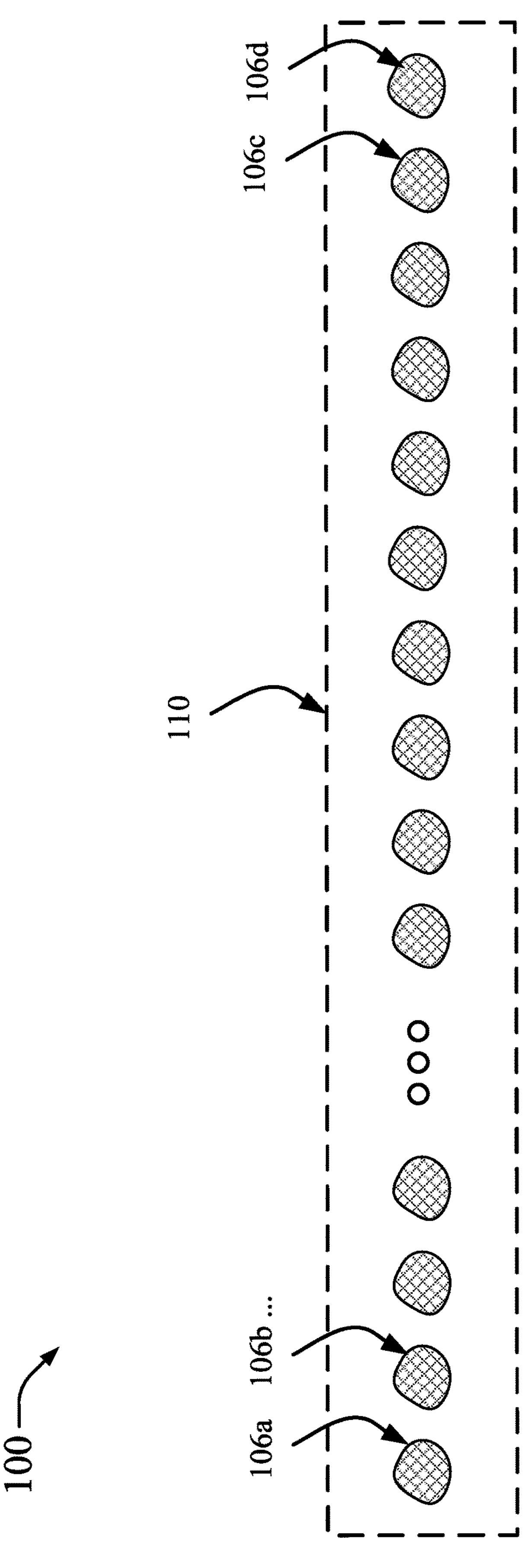
FIG. 1A illustrates a view of a vacuum chamber that houses electrodes for the trapping of atomic ions a linear crystal in accordance with aspects of the disclosure.
Figure 1A:

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts.

As described above, trapped atoms may be used to implement quantum information processing methods and systems. Atomic-based qubits can be used as different type of devices, including but not limited to quantum memories, quantum gates in quantum computers and simulators, and nodes for quantum communication networks. Qubits based on trapped atomic ions can have very good coherence properties, can be prepared and measured with nearly 100% efficiency, and can be readily entangled with each other by modulating their Coulomb interaction with suitable external control fields such as optical or microwave fields. As used in this disclosure, the terms "atomic ions," "atoms," and "ions" may be used interchangeably to describe the particles that are to be confined, or are actually confined, in a trap to form a crystal or similar arrangement or configuration. This disclosure describes techniques in the form of methods or processes and equipment or apparatuses for using laser beams to control qubit operations within a crystal of trapped atomic ions. Specifically, the present disclosure describes using propagating laser beams, one global beam and one or more individual beams, to control the states of one or more qubits.

The typical ion trap geometry or structure used for quantum information and metrology purposes is the linear radio frequency (RF) Paul trap (also referred to as an RF trap or simply a Paul trap), where nearby electrodes hold static and dynamic electrical potentials that lead to an effective inhomogeneous harmonic confinement of the ions. The RF Paul trap is a type of trap that uses electric fields to trap or confine charged particles in a particular region, position, or location. When atomic ions are laser-cooled to very low temperatures in such a trap, the atomic ions form a stationary crystal of qubits (e.g., a structured arrangement of qubits), with Coulomb repulsion balancing the external confinement force. For sufficient trap anisotropy, the ions can form a linear crystal along the weak direction of confinement, and this is the arrangement typically employed for applications in quantum information and metrology.

Individual addressing of each ion may be needed to control the phase, frequency, and/or amplitude, and/or also the polarization, as required by a particular quantum gate to be implemented using the ion. A single global optical beam may be applied or provided to all of the ions in an ion chain (e.g., a chain of ions in an ion trap) to control the ions, while also applying or providing individual optical beams to those ions on which quantum gates are to be performed or implemented. These counter-propagating optical beams, referred to as Raman optical beams or simply as Raman beams, are typically laser beams with a very high center frequency (e.g., 850 THz). These optical beams, however, have a well-defined frequency difference that produces a beatnote (e.g., 12.6 GHz), that is used as the qubit frequency. Radio frequency (RF) signals are used to control the frequency or the phase of the beatnotes produced by the optical beams, where the beatnotes are then used to drive the qubits (e.g., atomic or ion qubits) in the ion chain. This type control has been implemented in the past by using the single global optical beam as the means to adjust the frequency or phase of the beatnotes, but this approach has some limitations.

For example, when implementing a quantum gate with only a few of the ions in the ion chain, the global optical beam still illuminates the remaining ions (those not being used for the quantum gate), causing errors (e.g., systematic errors) in those ions that are illuminated by the global optical beam but not used because the global optical beam can produce undesirable residual quantum operations. An example of such residual operation is an energy shift or light shift (e.g., AC Stark shift), that tends to change or shift the phase of the qubits. Therefore, when running a quantum algorithm or quantum operation in which multiple quantum gates are implemented in sequence (e.g., a stack of combinations of single qubit gates and two-qubit or 2-qubit gates), the errors collected in the individual ions can accumulate during the quantum algorithm or operation.

Many of these systematic errors, however, can be tracked or monitored. For example, the two qubit levels in each ion are internal atomic states where the energy separation is well defined. Each ion therefore evolves at a known frequency. When an ion has a different energy (e.g., caused by the light shift) then it evolves at a different frequency. By knowing the frequency at which each ion evolves it is possible to monitor or track the respective phase since there is a free rotation that is always going on in the ion and therefore the frequency and phase are related. Accordingly, as long as the system (e.g., an experimental clock in the system) is configured to track a clock or duty cycle of an ion (e.g., an atomic qubit), it is possible to monitor or track the phase of that ion even as it shifts over time.

The errors (e.g., phase shifts or phase errors) caused by the residual operations described above can vary across the various ions in an ion chain. Accordingly, these errors need to be individually corrected for each ion. When control of the ions is limited to using the single global optical beam for this purpose as in previous systems, individual correction of these errors is not possible because there is no mechanism for individual correction of the ions. Moreover, these shifts in frequency (and phase) tend to accumulate over time to a point where even if the systematic errors are known, they may be difficult to correct. Therefore not only do these errors need to be corrected for each individual ion, they also need to be corrected dynamically as the quantum operation or quantum algorithm progresses.

In view of the issues described above, a quantum information processing (QIP) system based on multiple trapped ions may require independent control the state of each trapped ion to achieve flexibility in performing logic with low overhead. The states of the trapped ions may be controlled using Raman transitions where the beatnote between two Raman optical beams may be used to coherently drive the internal qubit states. For controlling individual trapped ions in a QIP system, an array of Raman optical beams to provide individual addressing optical beams for each a single trapped ion. By using a multi-channel acousto-optic modulator (AOM), each of the individual addressing optical beams can be controlled to thereby have the ability to individually correct for any systematic errors that are collected by the trapped ions. It is to be understood that while a multi-channel AOM is referred to herein for individual trapped ion control, the disclosure need not be so limited and the multi-channel AOM may be implemented using multiple single-channel AOMs or multiple smaller multi-channel AOMs.

In some aspects of the disclosure, a multi-channel AOM may include a number of arbitrary waveform generators (AWGs) or direct digital synthesizers (DDSs) where each AWG/DDS independently controls a channel of the AOM for a respective addressing optical beam. Consequently, each Raman optical beam in the corresponding channel may include different phase, amplitude, and/or frequency. In some examples, the polarization of the Raman optical beam may also be modulated or controlled. The individually controlled addressing Raman optical beams, together with counter-propagating global Raman optical beam, may rely on the Raman beatnote(s) between the individually controlled Raman optical beams and the global Raman optical beams to tune the states of the trapped ions. The simultaneous control of the Raman optical beams (single tone or multiple tones) allows the states of the trapped ions to be independently and concurrently controlled by the multi-channel AOM. In some implementations, the simultaneous control of the addressing optical beams may reduce delay in changing the states of the trapped ions and compensate for any energy shifts caused by the illumination of the global optical beam.

In other implementations, an optical setup associated with the multi-channel AOM may guide the individually controlled Raman optical beams toward the trapped ions despite different deflection/diffraction angles exiting the AOM.

In certain examples, the individually controlled Raman optical beams of the multi-channel AOM may advance the phase of the trapped ions to correct or mitigate the errors caused by energy shift during quantum gate operations.

Various aspects associated with solutions to the issues described above are explained in more detail below in connection with FIGS. 1A-8.

FIG. 1A shows a diagram 100 that illustrates a vacuum chamber having multiple atomic ions 106 trapped in a linear crystal 110 using a linear RF Paul trap (the linear crystal 100 can be inside a vacuum chamber not show). In the example shown in FIG. 1A, a vacuum chamber in a quantum system includes electrodes for trapping multiple (e.g., N>1, where N is a number as large as 100 or even larger, with some implementation having N=32) atomic Ytterbium ions (e.g., $^{171}Yb^{+}$ ions) which are confined in the linear crystal 110 and are laser-cooled to be nearly at rest. The number of atomic ions trapped can be configurable and more or fewer atomic ions may be trapped. The atoms are illuminated with laser (optical) radiation tuned to a resonance in $^{171}Yb^{+}$ and the fluorescence of the atomic ions is imaged onto a camera. In this example, atomic ions are separated by about 5 microns (m) from each other as shown by fluorescence. The separation of the atomic ions is determined by a balance between the external confinement force and Coulomb repulsion.

Figure 1B:
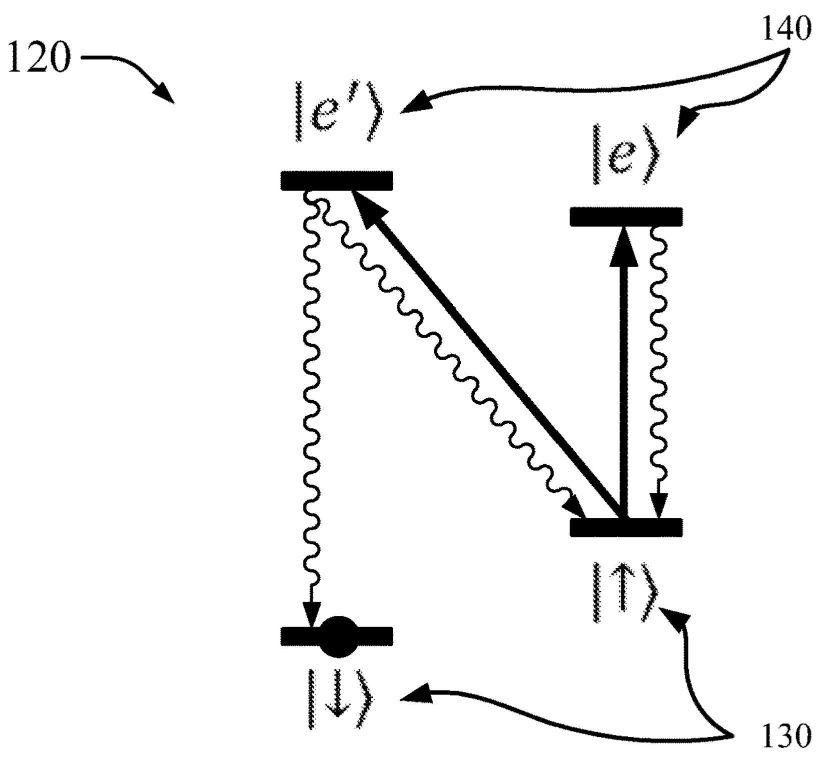
FIG. 1B is a diagram illustrating an example of a reduced energy level diagram showing the application of laser radiation for state initialization in accordance with aspects of the disclosure.
Figure 1C:
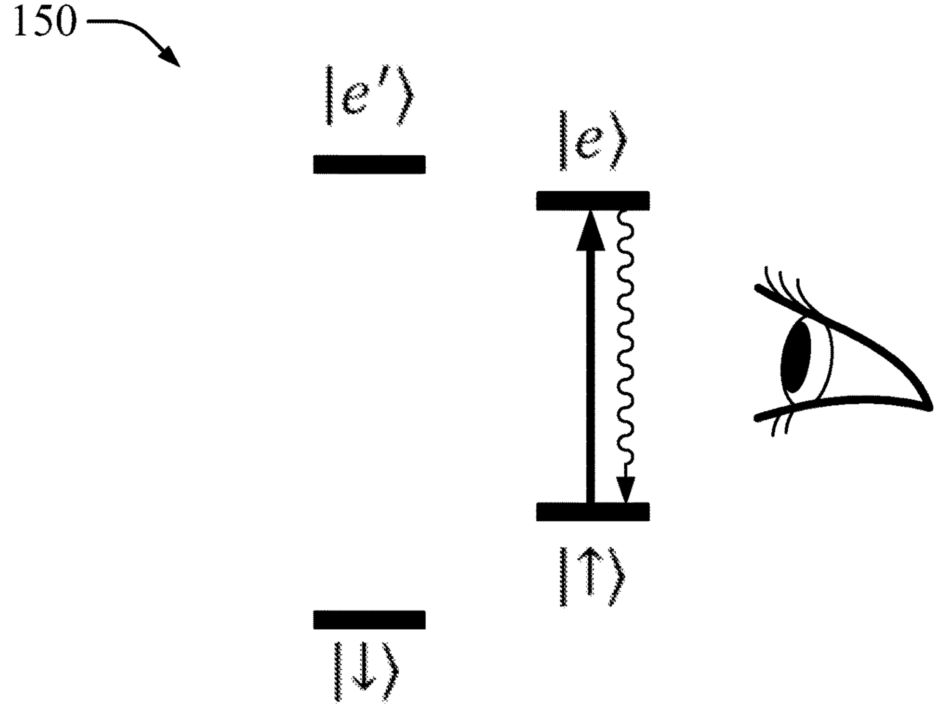
FIG. 1C is a diagram illustrating an example of a reduced energy level diagram showing the application of laser radiation for qubit state detection through fluorescence in accordance with aspects of the disclosure.

Strong fluorescence of individual trapped atomic ions relies on the efficient cycling of photons, thus the atomic structure of the ion must have a strong closed optical transition that allows for laser-cooling of the motion, qubit state initialization, and efficient qubit readout. This may rule out many atomic ion species, apart from simple atomic ions with a lone outer electron, such as the alkaline-earths ($Be^{+}$, $Mg^{+}$, $Ca^{+}$, $Sr^{+}$, $Ba^{+}$) and particular transition metals ($Zn^{+}$, $Hg^{+}$, $Cd^{+}$, and $Yb^{+}$). Within these atomic ions, quantum bits can be represented by two stable electronic levels, often characterized by an effective spin with the two states $|\uparrow\rangle$ and $|\downarrow\rangle$, or equivalently $|1\rangle$ and $|0\rangle$. FIG. 1B and FIG. 1C show the reduced energy level diagrams 120 and 150, respectively, for atomic ion $^{171}Yb^{+}$, where the qubit levels $|\uparrow\rangle$ and $|\downarrow\rangle$ 130 are represented by the stable hyperfine levels in the ground electronic state, and are separated by frequency $\omega_0/2\pi$=12.642812 GHz. The excited electronic states $|e\rangle$ and $|e'\rangle$ 140 in $^{171}Yb^{+}$ are themselves split by a smaller hyperfine coupling and are separated from the ground states by an optical interval having an energy corresponding to an optical wavelength of 369.53 nm.

Laser radiation tuned just below resonance in these optical transitions allows for Doppler laser cooling to confine the atomic ions near the bottom of the trap. Other more sophisticated forms of laser cooling can bring the atomic ions to be nearly at rest in the trap.

When a bichromatic laser or optical beam (e.g., a beam with two tones produced by sidebands resulting from optical modulation) resonant with both $|\uparrow\rangle\leftrightarrow|e\rangle$ and $|\downarrow\rangle\leftrightarrow|e'\rangle$ transitions is applied to the atom, it rapidly falls into the state $|\downarrow\rangle$ and no longer interacts with the light field, allowing the initialization of the qubit with essentially 100% fidelity (see e.g., FIG. 1B).

When a single laser or optical beam resonant with the $|\uparrow\rangle\leftrightarrow|e\rangle$ transition is applied, a closed cycling optical transition causes an ion in the $|\uparrow\rangle$ state to fluoresce strongly while an ion in the $|\downarrow\rangle$ state stays dark because the laser frequency is far from its resonance (see e.g., FIG. 1C). The collection of even a small fraction of this fluorescence allows for the detection of the atomic qubit state with near-perfect efficiency or accuracy. Other atomic species may have similar initialization/detection schemes.

In FIGS. 1B and 1C, all allowed transitions from the excited electronic states $|e\rangle$ and $|e'\rangle$ 140 are illustrated as downward, wavy arrows. On the other hand, the applied laser radiation (which is shown as upward, straight arrows) drive these transitions for initialization to state $|\downarrow\rangle$ as shown in FIG. 1B, and for fluorescence detection of the qubit state ($|T\rangle$ =fluorescence, $|\downarrow\rangle$ =no fluorescence) as shown in FIG. 1C.

For coherent transitions between qubit levels, there can be single qubit rotation operations and entangling multi-qubit operations. Single qubit rotation operations may also be referred to as single qubit operations or simply as qubit flipping.

With respect to single qubit rotation operations, qubit levels $|\uparrow\rangle$ and $|\downarrow\rangle$ 130 in FIGS. 1B and 1C can be directly coupled with external control fields, resulting in single qubit rotation operations. For a running wave (resonant) field described by $E(t)=E_0 e^{ik\cdot x - i\omega t - i\psi}$, where k is the wavevector, ω is the field frequency, and ψ is the phase, on resonance ($\omega=\omega_0$) the result is a rotation operation on the qubit at position x (assuming the rotating wave approximation and that the phase ψ is constant during the operation), as illustrated below in equations (1) and (2):

$$|0\rangle \rightarrow \cos(\theta/2)|0\rangle + e^{+i\phi}\sin(\theta/2)|1\rangle, \quad (1)$$

$$|1\rangle \rightarrow \cos(\theta/2)|1\rangle + e^{-i\phi}\sin(\theta/2)|0\rangle, \quad (2)$$

where $\theta=\Omega t$ and $\phi=k\cdot x-\psi$. Here $\Omega=\mu E_0/h$ is the Rabi frequency that parametrizes the field-qubit coupling assuming an effective dipole transition with moment p. For two-field optical Raman fields A and B with coupling through an intermediate virtual level, the effective Rabi frequency is proportional to $\Omega_A\Omega_B$, the effective frequency of the field becomes the difference $\omega_A-\omega_B$, the wavevector k is given by the wavevector difference $\delta k=k_A-k_B$ between the two fields, and the phase becomes the phase difference $\delta\phi=\delta k\cdot x-(\psi_A-\psi_B)$. In practice, the two Raman fields must bridge the qubit frequency splitting $\omega_0$. This can be accomplished with discrete modulation elements or the use of a mode-locked frequency comb laser. An optical frequency comb is a laser source having a spectrum with a series of discrete, equally spaced frequency lines. The combing effect can be generated by a number of mechanisms, including periodic modulation (e.g., in amplitude and/or phase) of a continuous-wave laser, four-wave mixing in nonlinear media, or by stabilization of the pulse train generated by a mode-locked laser (e.g., the mode-locked frequency comb laser described above).

For two successive rotations on the qubit separated by a time T, the accumulated qubit phase is $\psi+\omega T$. If the control field is a single-field coupling in the optical domain, this may require control of the optical frequency and phase over extended operations (e.g., longer or more involved operations). However, for two-field optical Raman couplings between qubits, the accumulated qubit phase is $\psi_A-\psi_B+(\omega_A-\omega_B)T$, requiring control of the frequency difference $\omega_A-\omega_B$ and the phase difference $\psi_A-\psi_B$.

Figure 2A:
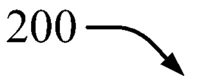
FIG. 2A is a diagram illustrating an example of Raman beam geometry in accordance with aspects of the disclosure.
Figure 2A:
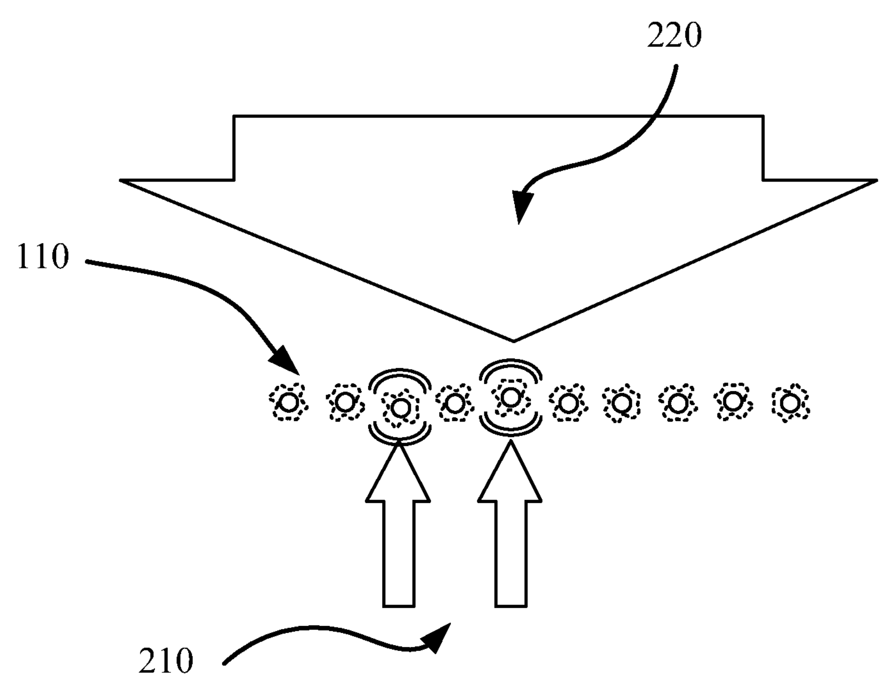
Figure 2B:
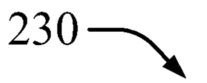
FIG. 2B is a diagram illustrating an energy level diagram showing coherent stimulated Raman transitions coupling the qubit states in accordance with aspects of the disclosure.
Figure 2B:
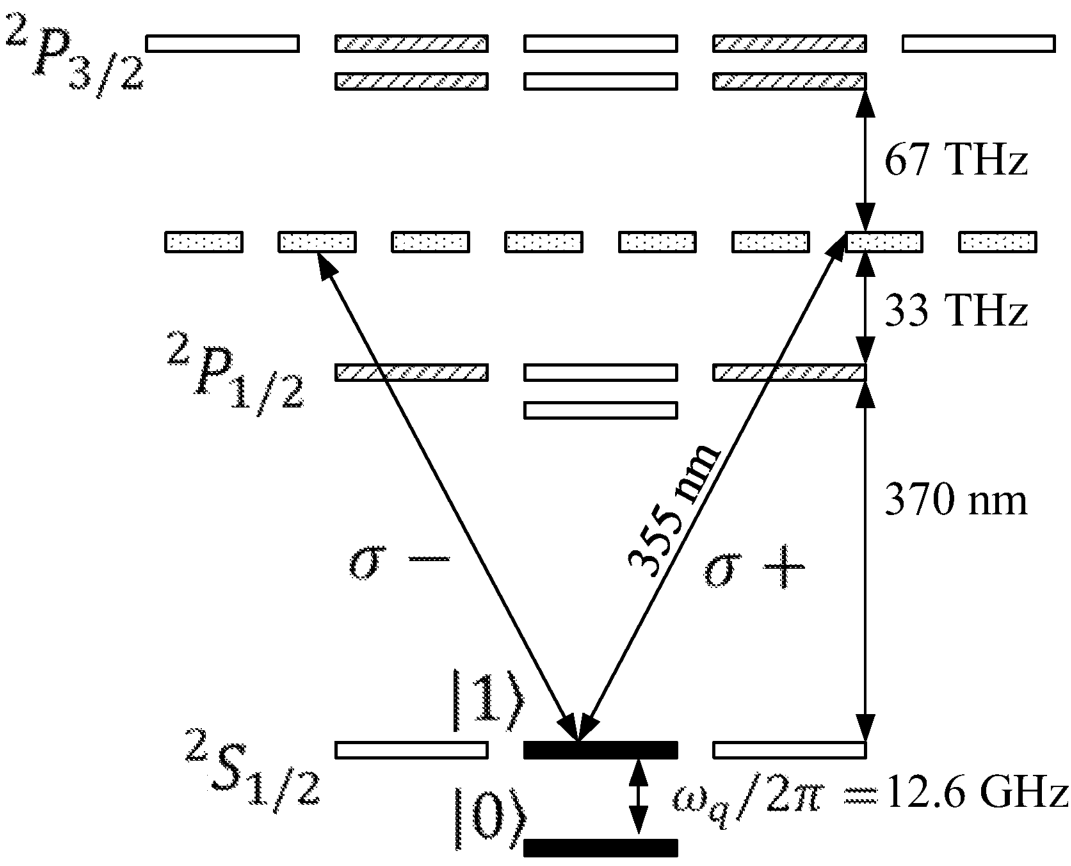

With respect to entangling multi-qubit operations, the motion of many trapped ions is coupled through the Coulomb interaction, much like an array of pendulums that are connected by springs. A natural way to implement entangling quantum logic gates between atomic ions in a crystal is to use the motion as an intermediary, as illustrated in FIG. 2A, which shows a diagram 200 illustrating an example of Raman beam geometry and where the application of optical beams produces motion in the qubits. In the diagram 200, there are individual beams 210 and a global beam 220 directed to the linear crystal 110 having the atomic ion qubits. The optical beams in the same direction may be referred to as co-propagating optical beams and the optical beams in different or opposite directions may be referred to as non-co-propagating or counter-propagating optical beams, respectively. The individual beams 210 (co-propagating) are focused or individually addressed beams, while the global beam 220 (which, as shown, counter-propagates with respect to the individual beams 210) may be an unfocused, global beam. As used herein, the terms "laser beams," "optical beams," "beams," "lasers," "optical fields," and "fields" may be used interchangeably.

Using motion as an intermediary, quantum logic gates can be accomplished by applying qubit state-dependent optical or microwave dipole forces to the atomic ion(s). There are many protocols for the creation of controlled-NOT gates and other related multi-qubit entangling operations using this externally-applied qubit state-dependent force. By way of illustration, the popular Molmer-Sorensen gate operation (also called MS, Ising, or XX gate operation) between two trapped ion qubits, although the phase dependence is similar in many similar classes of gates.

Still referring to FIG. 2A, the diagram 200 shows the Raman beam geometry for an example of a two qubit gate between select ions shown. Counter-propagating beams (pair of beams) 210 and beam 220 propagating in opposite directions overlap on two trapped ions, and Raman transitions that couple to the collective modes of motion allow entangling operations. For single-qubit rotations, individual ions are addressed, and it may not be necessary for a counter-propagating geometry. For single-qubit gates the operation involves a spin flip, also referred to as a carrier transition or resonant qubit transition. For two-qubit gates, the operation tends to drive motional sidebands, and those frequencies are a bit offset from the frequency used in single qubit transitions.

Coupling through a single mode of collection ion motion at frequency om is considered. In general, the Molmer-Sorensen gate operation requires two non-co-propagating or counter-propagating directions of laser beams (A and B) with wavevectors $k_A$ and $k_B$ that together drive both the upper and lower sideband transitions. The beam along direction A has a single frequency component $\omega_A$ with optical phase $\psi_A$ and the beam along direction B has two frequencies $$\omega_B^{\pm}$$

with optical phase $\psi_B$ so that the resulting two beatnotes between A and B are near the upper (+) and lower (−) sideband transitions. There are two spectral configurations to make these bichromatic beatnotes on beam B with respect the frequency of beam A, as illustrated below in equations (3) and (4):

$$\omega_B^{\pm} - \omega_A = +\omega_0 \pm (\omega_m + \delta)\text{"Phase Sensitive,"} \quad (3)$$

$$\omega_B^{\pm} - \omega_A = \pm\omega_0 + (\omega_m + \delta)\text{"Phase Insensitive,"} \quad (4)$$

That is, one possible configuration of the bichromatic beatnotes on beam B is phase sensitive (equation (3)) and the other possible configuration is phase insensitive (equation (4)).

As written, equations (3) and (4) assume that $$\omega_B^{+} > \omega_A; \text{ for } \omega_B^{+} < \omega_A,$$

a minus sign should be added to the right hand side of equations (3) and (4).

An important aspect is that the phase insensitive configuration has upper and lower sideband beatnotes of opposite signs ($\omega_1 >> \omega_m \pm \delta$), hence the optical phase accumulated from an interaction involving both beatnotes will cancel. The two-qubit evolution under the XX gate is shown below in equation (5):

$$|00\rangle \rightarrow |00\rangle - i|11\rangle e^{-i\chi}$$

$$|11\rangle \rightarrow |11\rangle - i|00\rangle$$

$$|01\rangle \rightarrow |01\rangle - i|10\rangle$$

$$|10\rangle \rightarrow |10\rangle - i|00\rangle e^{i\chi}, \quad (5)$$

where the effective phase of the XX gate is $\chi=(\psi_A-\psi_B)$ for the phase sensitive case and $\chi=0$ for the phase insensitive case.

For phase sensitive case, the actual phase accumulated by the gate depends on the optical phase of the beams, which can drift slowly with time as the effective optical path length difference between the two Raman beams change due to mechanical and thermal fluctuations of the beam paths. Even in this case, by having full control over the phase, frequency, and/or amplitude of the Raman beams (e.g., by using a multi-channel AOM, for example), it is possible to add adequate single qubit rotations before and after a two qubit gate such that the combined operation acts as a two-qubit gate with a well-defined phase shift that determines the property of the gate, as long as the optical path lengths remain stable within the duration of the combined manipulation. This is another phase correction approach that can be implemented with the techniques and systems described in this disclosure.

In view of the above description, and because synchronization, stability, and control of qubit phases is critical to the performance of extended quantum operations, the disclosure provides various techniques that can be used for control (e.g., phase, amplitude, frequency, polarization, etc.) of trapped ion qubits. Accordingly, various techniques are described below for manipulating the optical fields (e.g., the laser beams) in such a way that allows phase control of the qubit operations for extended quantum operations, where drifts in the optical phases may lead to decoherence. The required polarization of Raman beams to drive transitions in the qubit depends on the atomic structure of the qubit levels and their couplings to the excited states. As an example, the disclosure considers the $^{171}Yb^{+}$ system shown in an energy level diagram 230 in FIG. 2B in which coherent stimulated Raman transitions couple the two qubit states labeled $|0\rangle$ and $|1\rangle$ and separated by frequency $\omega_q$, driven by laser fields at 355 nm with either $\sigma_+/\sigma_+$ or $\sigma_-/\sigma_-$ polarizations for the two Raman beams (e.g., any Raman process is driven with both beams polarized $\sigma_+$ or $\sigma_-$). It is to be understood, however, that systems other than the $^{171}Yb^{+}$ system, having possibly different levels and transition selection rules, may also be used in connection with the features described herein.

As described above, it is important to have control of the manner in which optical fields or beams (e.g., generated by a laser or other optical source) are oriented, including control of their geometry, polarization, and/or frequency, for example.

Figure 3:
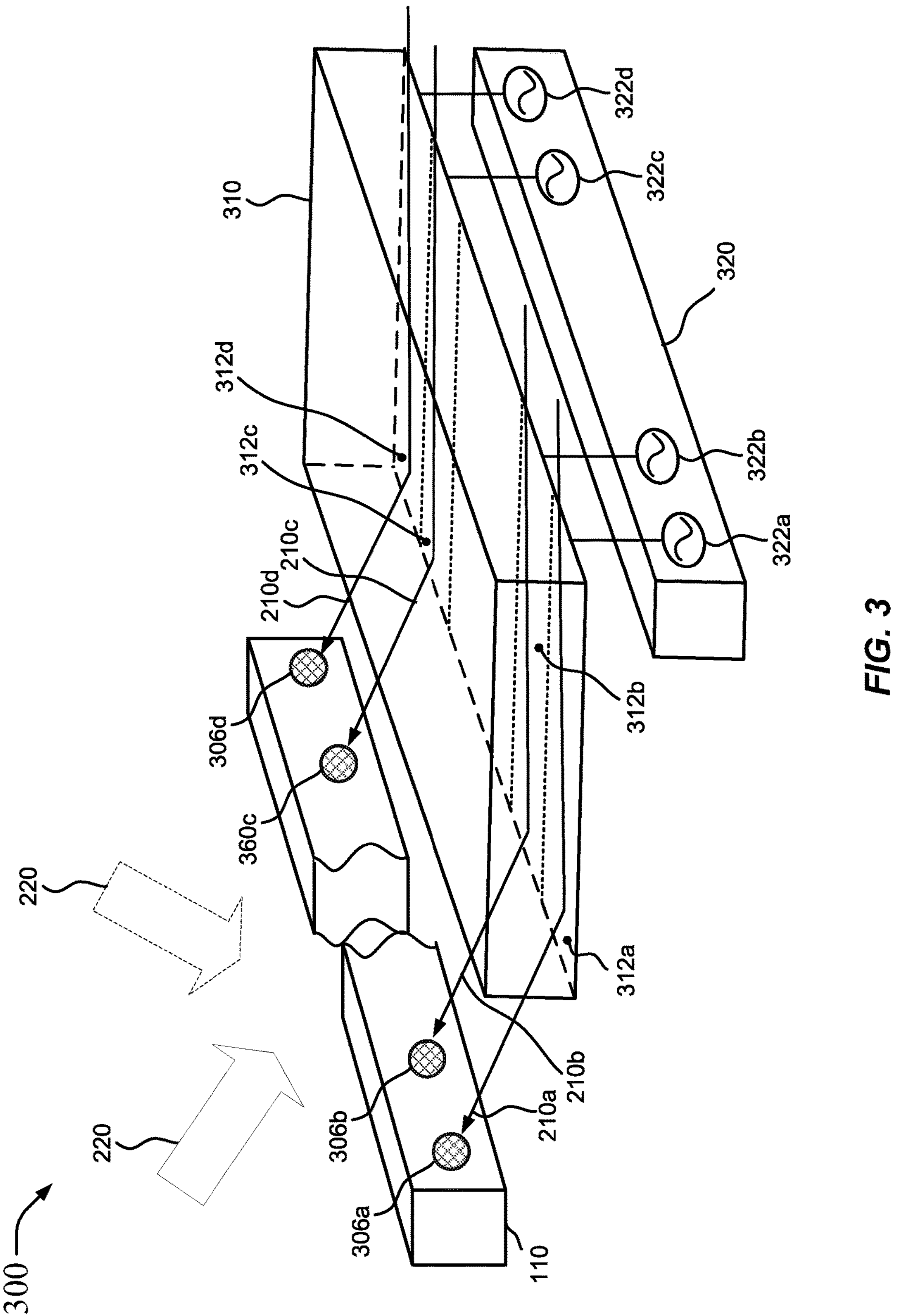
FIG. 3 is a diagram illustrating an example of a multi-channel acousto-optic modulator (AOM) for multi-qubit control in accordance with aspects of this disclosure.

Turning now to FIG. 3, an example of a system 300 that supports multi-qubits control using an acousto-optic modulator (AOM) 310. The system 300 may be part of a computer device 600 and/or a QIP system 700 described in more detail below in connection with FIGS. 6, 7A, and 7B. The system 300 includes the linear crystal 110 with trapped ions 306*a-d* represented by circles with crisscross pattern (corresponding to trapped ions 106*a-d* in FIG. 1A). The trapped ions 306*a-d* may be illuminated by a global optical beam 220 from a first direction and by the individual addressing optical beams 210*a-d* from a second direction different from the first direction. In one implementation, the second direction of the global optical beam 220 may be substantially opposite or directly opposite the first direction of the individual addressing optical beams 210*a-d* (see e.g., FIG. 2A). In another implementation, the second direction of the global optical beam 220 may be substantially or exactly 90 degrees (or 270 degrees) offset from the first direction of the individual addressing optical beams 210*a-d* as illustrated by the alternative direction of the global optical beam 220 shown in dashed lines in FIG. 3. In other words, the global optical beam 220 and the individual addressing optical beams 210*a-d* are in a same plane and directed towards the trapped ions 106*a-d* from different directions or are in perpendicular planes and directed towards the trapped ions 106*a-d*. It is to be understood that a combination of directions may also be possible where for some of the trapped ions the directions of the beams are substantially opposite or opposite and for other trapped ions the directions of the beams are substantially or exactly 90 degrees (or 270 degrees) offset from each other. The term substantially as used herein may refer to a variation from a nominal value or characteristic, where the variation is within 0.5%, 1%, 2%, 3%, 4%, 5%, or 10% of the nominal value.

While four trapped ions 306*a-d* are shown by way of illustration in FIG. 3, the linear crystal 100 may have 1, 2, 5, 6, 10, 16, 20, 32, 50, 64, 128 or more trapped ions and it may be possible to use any subset of those trapped ions when implementing various quantum gates. The AOM 310 may be multi-channel Bragg cell having piezo-electric transducers 312*a-d* (e.g., in a parallel arrangement) that locally apply acoustic waves to the AOM 310. The AOM 310 may include a different channel for each of the trapped ions 106. The piezo-electric transducers 312*a-d* may be controlled by a controller 320 (which may be part of an optical controller 720 described below in connection with FIGS. 7A and 7B) having waveform generators 322*a-d*. The waveform generators 322*a-d* may be arbitrary waveform generators (AWGs) and/or direct digital synthesizers, or some other type of signal generating device. During operation, in some implementations, the global optical beam 220 may illuminate the trapped ions 306*a-d* from the first direction. The global optical beam 220 may be Raman optical beams from one or more Raman lasers. Optical equipment (e.g., lenses, mirrors, and the like—not shown) may be used to focus the global optical beam 220 onto the trapped ions 306*a-d* (see e.g., FIG. 4). The global optical beam 220 may have a single frequency, phase, and amplitude. The individual addressing optical beams 210*a-d* may be provided to separately illuminate on some of the trapped ions 306*a-d* from the second direction. The trapped ions 306 that are illuminated depend on the quantum gate(s) being implemented in a current stage of a sequence that is part of a quantum operation or algorithm. For example, the individual addressing optical beam 210*a* may illuminate on the trapped ion 306*a*. The individual addressing optical beam 210*b* may illuminate on the trapped ion 306*b*. The individual addressing optical beam 210*c* may illuminate on the trapped ion 306*c*. The individual addressing optical beam 210*d* may illuminate on the trapped ion 306*d*. In some examples, some trapped ions (not shown) are not illuminated by any individual addressing optical beams. In other implementations, it may be advantageous to illuminate all the trapped ions 306*a-d* to correct for any energy shift (discussed below) caused by the illumination of the global optical beam 220.

Still referring to FIG. 3, in certain implementations, the frequency, amplitude, and/or phase of each of the individual addressing optical beams 210*a-d* may be modulated by AOM 310. For example, the waveform generator 322*a* may cause the transducer 312*a* to generate a first acoustic wave having a first predetermined quality. The first acoustic wave generated by the transducer 312*a* may cause the individual addressing optical beam 210*a* to have a first frequency, a first phase, and/or a first amplitude. The difference between the first frequency and the frequency of the global optical beam 220 may create a first beatnote used to control the state of the trapped ion 306*a*. The first frequency, the first phase, and/or the first amplitude may be dynamically varied over time using this approach. The waveform generator 322*b* may cause the transducer 312*b* to generate a second acoustic wave having a second predetermined quality. The second acoustic wave generated by the transducer 312*b* may cause the individual addressing optical beam 210*b* to have a second frequency, a second phase, and/or a second amplitude. The difference between the second frequency and the frequency of the global optical beam 220 may create a second beatnote used to control the state of the trapped ion 306*b*. The second frequency, the second phase, and/or the second amplitude may be dynamically varied over time using this approach.

Still referring to FIG. 3, in some examples, the waveform generator 322*c* may cause the transducer 312*c* to generate a third acoustic wave having a third predetermined quality. The third acoustic wave generated by the transducer 312*c* may cause the individual addressing optical beam 210*c* to have a third frequency, a third phase, and/or a third amplitude. The difference between the third frequency and the frequency of the global optical beam 220 may create a third beatnote used to control the state of the trapped ion 306*c*. The third frequency, the third phase, and/or the third amplitude may be dynamically varied over time using this approach. The waveform generator 322*d* may cause the transducer 312*d* to generate a fourth acoustic wave having a fourth predetermined quality. The fourth acoustic wave generated by the transducer 312*d* may cause the individual addressing optical beam 210*d* to have a fourth frequency, a fourth phase, and/or a fourth amplitude. The difference between the fourth frequency and the frequency of the global optical beam 220 may create a fourth beatnote used to control the state of the trapped ion 306*d*. The fourth frequency, the fourth phase, and/or the fourth amplitude may be dynamically varied over time using this approach. Since the individual addressing optical beams 210*a-d* may be individually modulated by the controller 320 (via the waveform generators 322*a-d*) and the AOM 310 (via the transducers 312*a-d*), the individual addressing optical beams 210*a-d* and the global optical beam 220 may collectively create up to four beatnotes to independently control the states of the trapped ions 306*a-d*. It is to be understood that the global optical beam 220 may also be controlled by the controller 320 or by a different controller. Although four trapped ions 306 have been described in this example, the number of trapped ions and/or which trapped ions are provided with modulated individually addressing optical beams 210 can vary overtime based on a stack of quantum gates (e.g., multiple stages of quantum gates) that are implemented as part of a sequence in a quantum operation.

Figure 4:
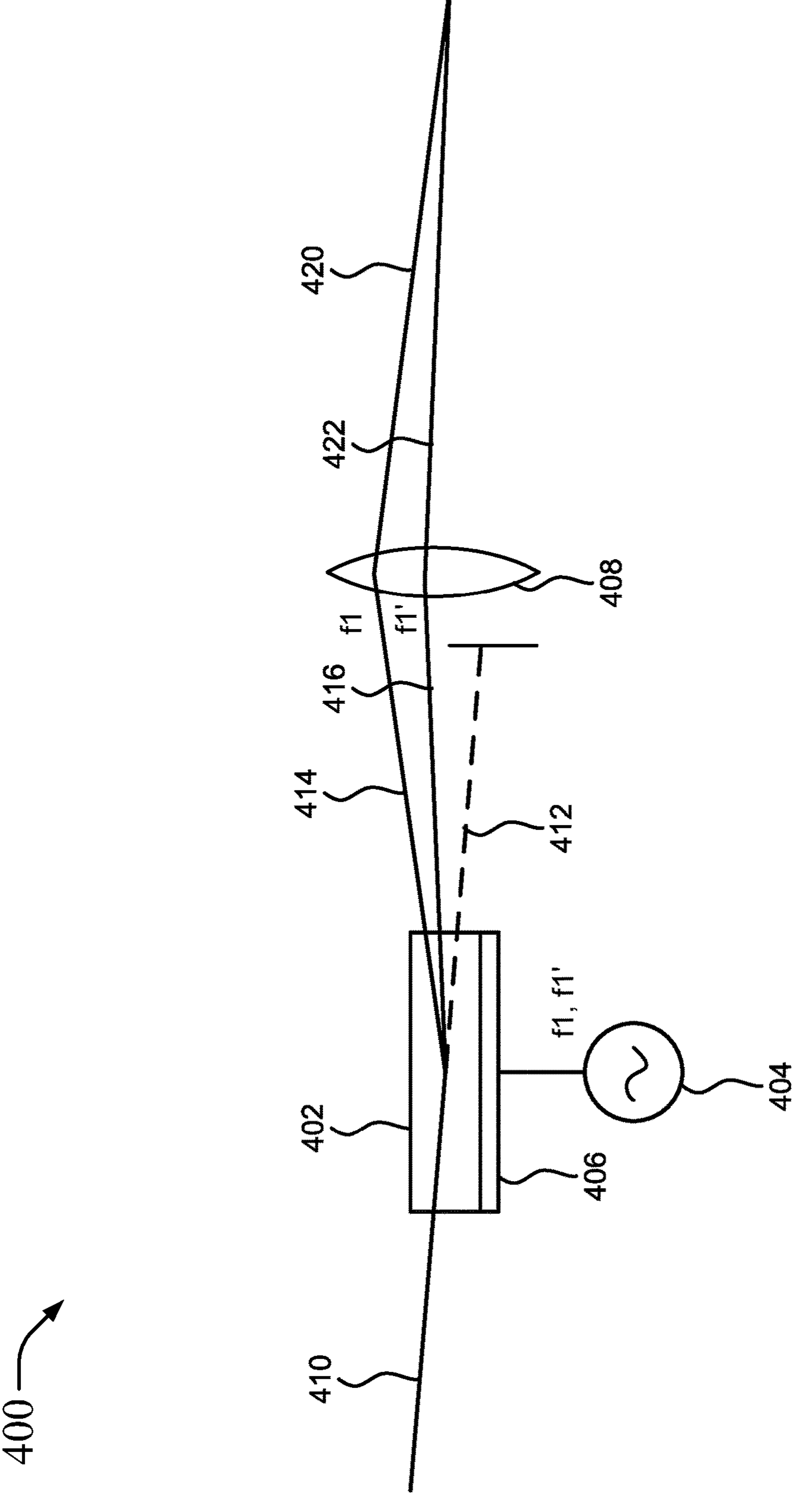
FIG. 4 is a diagram illustrating an example of a multi-tone Raman beam alignment system in accordance with aspects of this disclosure.

Turning now to FIG. 4, an example of multi-tone Raman beam alignment system 400 may be used to focus diffracted Raman beams onto a trapped ion for use in, for example, the implementation of certain quantum gate operations, such as the example described above in connection with FIG. 3. For example, the alignment system 400 (which may be part of the computer device 600 and/or the QIP system 700) may include a multi-channel AOM 402 (which may be an example of the multi-channel AOM 310 in FIG. 3) of which a single channel is illustrated for simplicity (other channels may be positioned into or out of the plane of FIG. 4). The alignment system 400 may include, in connection with the channel being illustrated, a waveform generator 404, a transducer 406, and a lens assembly 408. A similar structure may be used for the other channels in the multi-channel AOM 402.

During operation, in some implementations, the transducer 406 (under the control of the waveform generator 404) may generate acoustic waves having frequencies f1 and f1'. Consequently, an incident Raman beam 410 (e.g., one of the individual addressing optical beams 210) may be generated and provided to the AOM 402 and may diffract into output beam 412 (undeflected), output beam 414 (with frequency f1), and output beam 416 (with frequency f1'), where output beams 414, 416 have different diffraction angles. The output beams 414, 416 may pass through the lens assembly 408 and may redirected into reflected beams 420, 422, respectively. The reflected beams 420, 422 may be refocused by the lens assembly 408 onto a trapped ion 430. Although the lens assembly 408 is shown as a single optical element, the disclosure need not be so limited and the lens assembly 408 may include multiple optical elements, including different types of lenses, for example.

Figure 5:
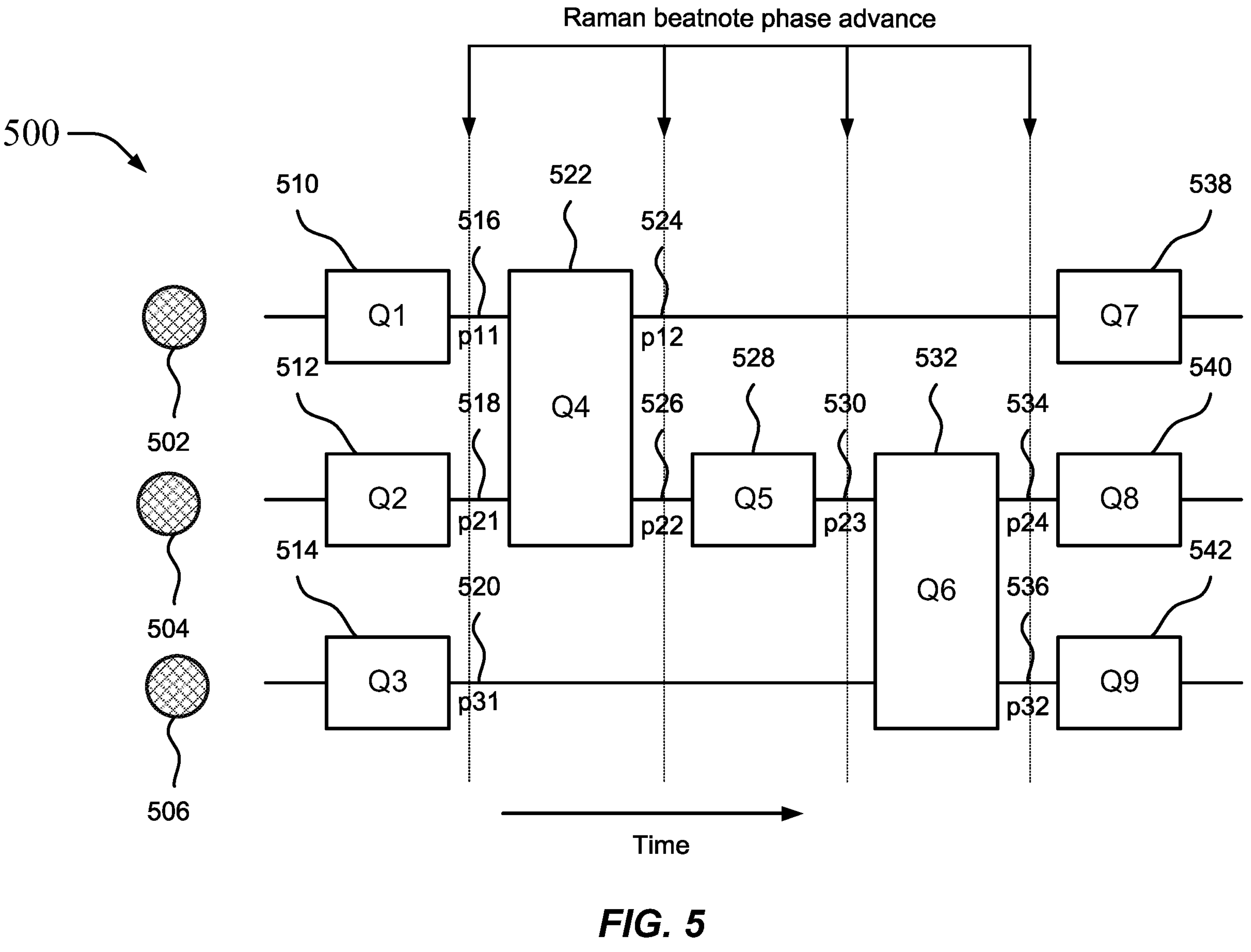
FIG. 5 is a diagram illustrating an example of a gate sequence with three qubits in accordance with aspects of this disclosure.

Turning now to FIG. 5, an example of a gate sequence 500 for a three qubit system includes single qubit gates 510 (Q1), 512 (Q2), 514 (Q3), 528 (Q5), 538 (Q7), 540 (Q8), 542 (Q9) and two-qubit gates 522 (Q4), 532 (Q6) based on trapped ions 502, 504, 506 (which may correspond to trapped ions in the linear crystal 110 in FIGS. 1A and 3). In some implementations, performing quantum gates on qubits based on the trapped ions 502, 504, 506 may cause shifts in qubit energy splitting. This gives rise to the advancement of the qubit phase based on the energy shift and the duration of the gate and is a cause of error in quantum operations or algorithms. To eliminate this error caused by the energy shifts, the Raman beatnotes of each trapped ions 502, 504, 506 may be phased advanced using, for example, the multi-channel AOM system of FIG. 3 with individually addressable beams. The timing of such phase advances may occur at positions 516, 518, 520, 524, 526, 530, 534, and 536. That is, after a first stage in the sequence that includes a set of quantum gates (Q1, Q2, Q3), phase advances p11, p21, and p31 may be performed for each of the gates, respectively. Similarly, after a second stage that includes a two-qubit gate Q4, phase advances p12 and p22 may be performed in connection with trapped ions 502 and 504. After a third stage that includes a single-qubit gate Q5, phase advance p23 may be performed in connection with trapped ion 504. After a fourth stage in the sequence that includes a two-qubit gate Q6, phased advances p24 and p32 may be performed in connection with trapped ions 504 and 506. A fifth stage in the sequence includes the set of quantum gates Q7, Q8, and Q9, and a subsequent phase advance may also be performed (although not shown in this example). This example is provided by way of illustration, and similar approaches may be applied when the number of qubits considered is more or less than three and when the number of stages in the sequence is smaller or larger than five.

Still referring to FIG. 5, the qubit energy shifts may originate from the illumination of the trapped ions by the global optical beam 220. As energy from the global optical beam 220 is transferred to the trapped ions (e.g., trapped ions 502, 504, and 506) during illumination, there may be an unintended residual operation on the trapped ions. By separately controlling the beam characteristics of the individual addressing optical beams 210 provided to the trapped ions 502, 504, and 506 through, for example, the AOM 310, the AOM 310 may be used to continuously compensate for energy shifts caused by the global optical beam 220. For example, if the global optical beam 220 causes an energy shift in the trapped ion 502, a respective individual addressable optical beam 210 may be used to correct or mitigate the energy shift and therefore reduce the likelihood of a systematic error. One way to do so is by performing a phase advance as described above.

Figure 6:
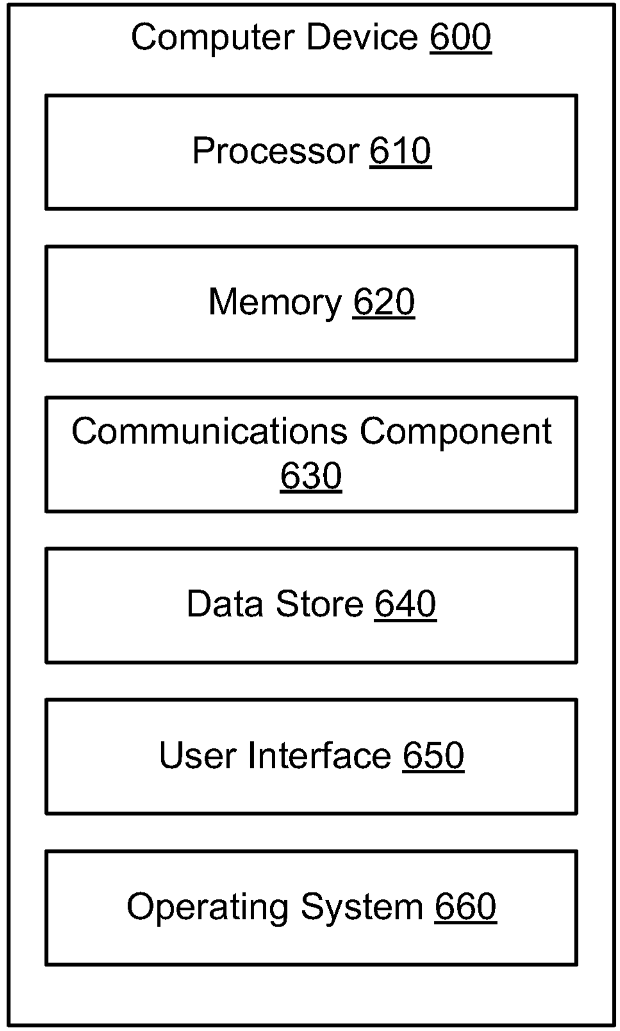
FIG. 6 is a diagram that illustrates an example of a computer device in accordance with aspects of this disclosure.

Referring now to FIG. 6, illustrated is an example computer device 600 in accordance with aspects of the disclosure. The computer device 600 can represent a single computing device, multiple computing devices, or a distributed computing system, for example. The computer device 600 may be configured as a quantum computer (e.g., a quantum information processing (QIP) system), a classical computer, or a combination of quantum and classical computing functions. For example, the computer device 600 may be used to process information using quantum algorithms based on trapped ion technology and may therefore implement methods for independent control of Raman optical beams in a multi-channel AOM, as applied to quantum logic gates, and in connection with generalized interactions between qubits as described in this disclosure. A generic example of the computer device 600 as a QIP system that can implement the various beam controls described herein is illustrated in an example shown in FIGS. 7A and 7B.

In one example, the computer device 600 may include a processor 610 for carrying out processing functions associated with one or more of the features described herein. The processor 610 may include a single or multiple set of processors or multi-core processors. Moreover, the processor 610 may be implemented as an integrated processing system and/or a distributed processing system. The processor 610 may include a central processing unit (CPU), a quantum processing unit (QPU), a graphics processing unit (GPU), or combination of those types of processors. When supporting quantum operations, the processor 610 may at least include trapped ions to implement the quantum operations. In one aspect, the processor 610 may refer to a general processor of the computer device 600, which may also include additional processors 610 to perform more specific functions such as functions for individual addressing optical beam control.

In an example, the computer device 600 may include a memory 620 for storing instructions executable by the processor 610 for carrying out the functions described herein. In an implementation, for example, the memory 620 may correspond to a computer-readable storage medium that stores code or instructions to perform one or more of the functions or operations described herein. In one example, the memory 620 may include instructions to perform aspects of a method 800 described below in connection with FIG. 8. Just like the processor 610, the memory 620 may refer to a general memory of the computer device 600, which may also include additional memories 620 to store instructions and/or data for more specific functions such as instructions and/or data for individual beam control.

Further, the computer device 600 may include a communications component 630 that provides for establishing and maintaining communications with one or more parties utilizing hardware, software, and services as described herein. The communications component 630 may carry communications between components on the computer device 600, as well as between the computer device 600 and external devices, such as devices located across a communications network and/or devices serially or locally connected to computer device 600. For example, the communications component 630 may include one or more buses, and may further include transmit chain components and receive chain components associated with a transmitter and receiver, respectively, operable for interfacing with external devices.

Additionally, the computer device 600 may include a data store 640, which can be any suitable combination of hardware and/or software, that provides for mass storage of information, databases, and programs employed in connection with implementations described herein. For example, the data store 640 may be a data repository for operating system 660 (e.g., classical OS, or quantum OS). In one implementation, the data store 640 may include the memory 620.

The computer device 600 may also include a user interface component 650 operable to receive inputs from a user of the computer device 600 and further operable to generate outputs for presentation to the user or to provide to a different system (directly or indirectly). The user interface component 650 may include one or more input devices, including but not limited to a keyboard, a number pad, a mouse, a touch-sensitive display, a digitizer, a navigation key, a function key, a microphone, a voice recognition component, any other mechanism capable of receiving an input from a user, or any combination thereof. Further, the user interface component 650 may include one or more output devices, including but not limited to a display, a speaker, a haptic feedback mechanism, a printer, any other mechanism capable of presenting an output to a user, or any combination thereof.

In an implementation, the user interface component 650 may transmit and/or receive messages corresponding to the operation of the operating system 660. In addition, the processor 610 may execute the operating system 660 and/or applications or programs, and the memory 620 or the data store 640 may store them.

When the computer device 600 is implemented as part of a cloud-based infrastructure solution, the user interface component 650 may be used to allow a user of the cloud-based infrastructure solution to remotely interact with the computer device 600.

Figure 7A:
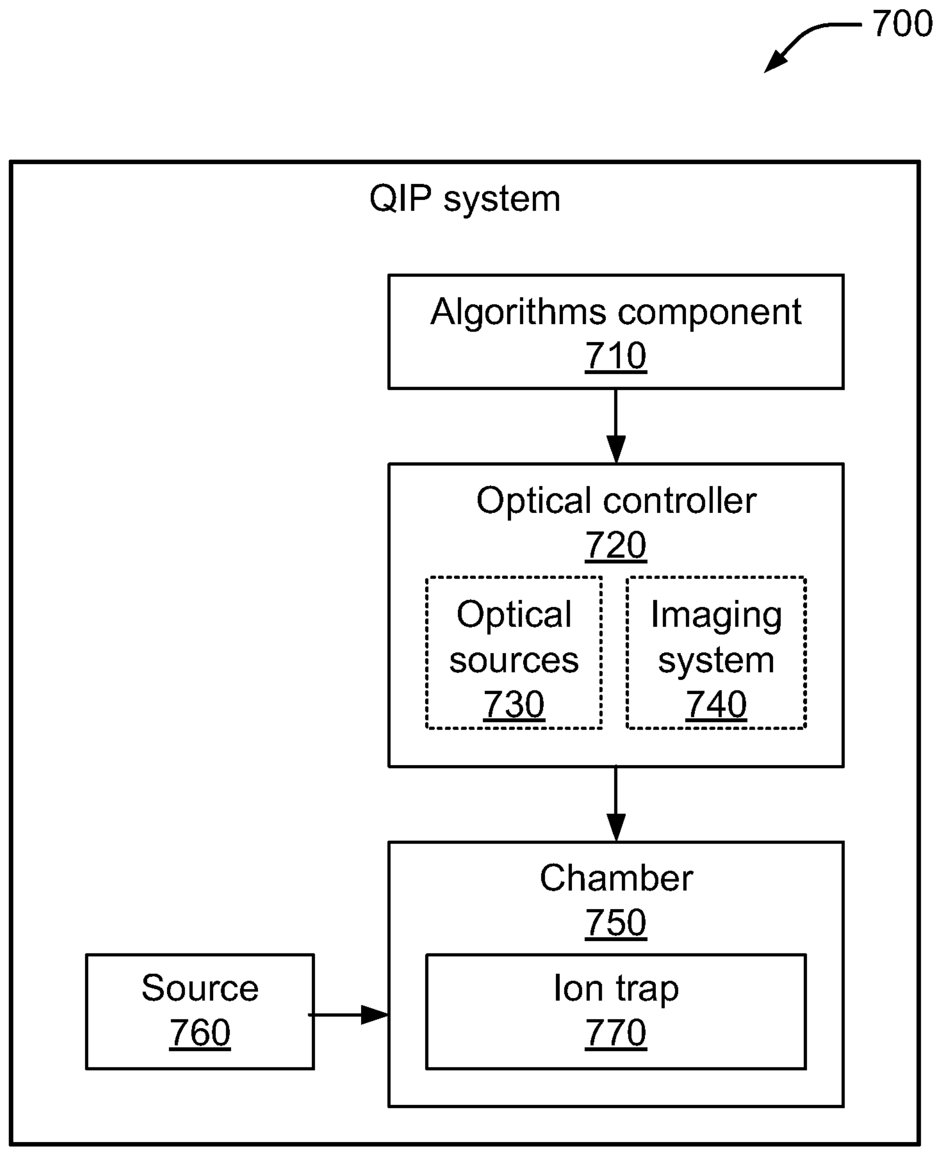
FIG. 7A is a block diagram that illustrates an example of a quantum information processing (QIP) system in accordance with aspects of this disclosure.

FIG. 7A is a block diagram that illustrates an example of a QIP system 700 in accordance with aspects of this disclosure. The QIP system 700 may also be referred to as a quantum computing system, a computer device, or the like. In an aspect, the QIP system 700 may correspond to portions of a quantum computer implementation of the computer device 600 in FIG. 6.

Figure 7B:
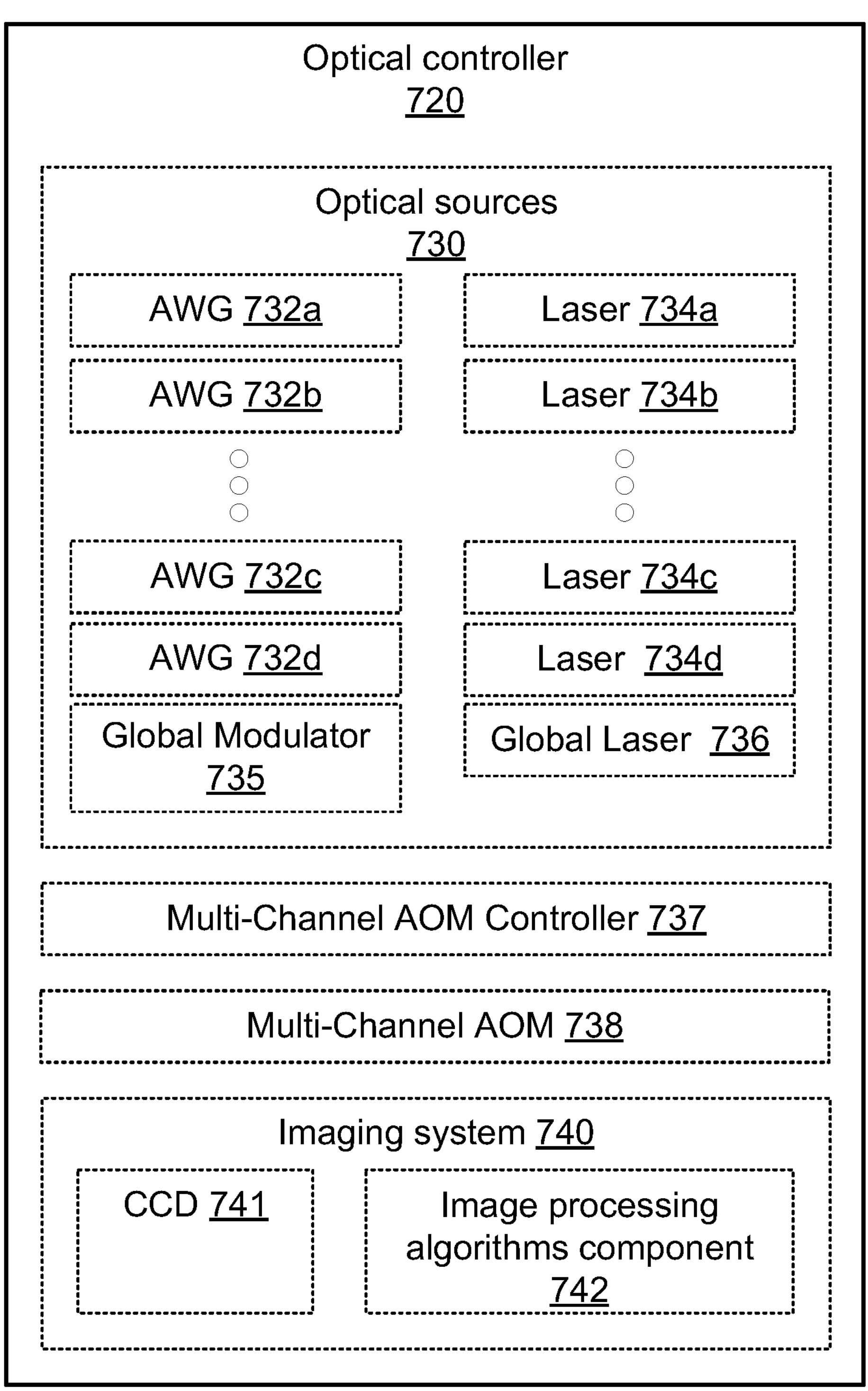
FIG. 7B is a block diagram that illustrates an example of an optical controller in accordance with aspects of this disclosure

The QIP system 700 can include a source 760 that provides atomic species (e.g., a flux of neutral atoms) to a chamber 750 (e.g., vacuum chamber in FIG. 1A) having an ion trap 770 that traps the atomic species once ionized (e.g., photoionized) by an optical controller 720 (see e.g., FIG. 7B). Optical sources 730 in the optical controller 720 may include one or more laser sources (e.g., sources of optical or laser beams) that can be used for ionization of the atomic species, control of the atomic ions, for fluorescence of the atomic ions that can be monitored and tracked by image processing algorithms operating in an imaging system 740 in the optical controller 720, and/or to perform the optical control functions described in this disclosure. In an aspect, the optical sources 730 may be implemented separately from the optical controller 720.

The imaging system 740 can include a high resolution imager (e.g., CCD camera) for monitoring the atomic ions while they are being provided to the ion trap or after they have been provided to the ion trap 770. In an aspect, the imaging system 640 can be implemented separate from the optical controller 720, however, the use of fluorescence to detect, identify, and label atomic ions using image processing algorithms may need to be coordinated with the optical controller 720.

The QIP system 700 may also include an algorithms component 710 that may operate with other parts of the QIP system 700 (not shown) to perform quantum algorithms or quantum operations, including a stack or sequence of combinations of single qubit operations and/or multi-qubit operations (e.g., two-qubit operations) as well as extended quantum computations. As such, the algorithms component 710 may provide instructions to various components of the QIP system 700 (e.g., to the optical controller 720) to enable the implementation of the quantum algorithms or quantum operations, and consequently, implement the various individual addressing optical beam control techniques described herein.

FIG. 7B shows at least a portion of the optical controller 720. In this example, the optical controller 720 may include the optical sources 730 and the imaging system 740. As shown by the dotted lines, one or both of the optical sources 730 and the imaging system 740 may be optionally implemented separate from, but in communication with, the optical controller 720. The imaging system 740 includes a CCD 741 (or similar imager or camera) and an image processing algorithms component 742. The optical sources 730 includes AWGs (or DDSs) 732*a-d* and laser sources 734*a-d*, which may be used for one or more of the functions of individual addressing optical beam control described above. The optical sources 730 may also include a global modulator 736 and a global laser source 738 for emitting and controlling the global Raman optical beam 220. Further, the optical controller 720 may include a multi-channel AOM controller 737 configured to control the operations of a multi-channel AOM 738, which may correspond to the multi-channel AOM 310 described above. As mentioned above, the multi-channel AOM 738 may be implemented using a single AOM device with multiple channels, multiple AOM devices with a single channel, or multiple AOM devices with multiple and/or single channels. The multi-channel AOM controller 737 may also be configured to monitor or track the phase shifts of individual trapped ions to correct or mitigate their effect by using, for example, the phase advancement techniques described above. Although not shown, the alignment system 400 in FIG. 4 may also be implemented as part of the optical controller 720.

Figure 8:
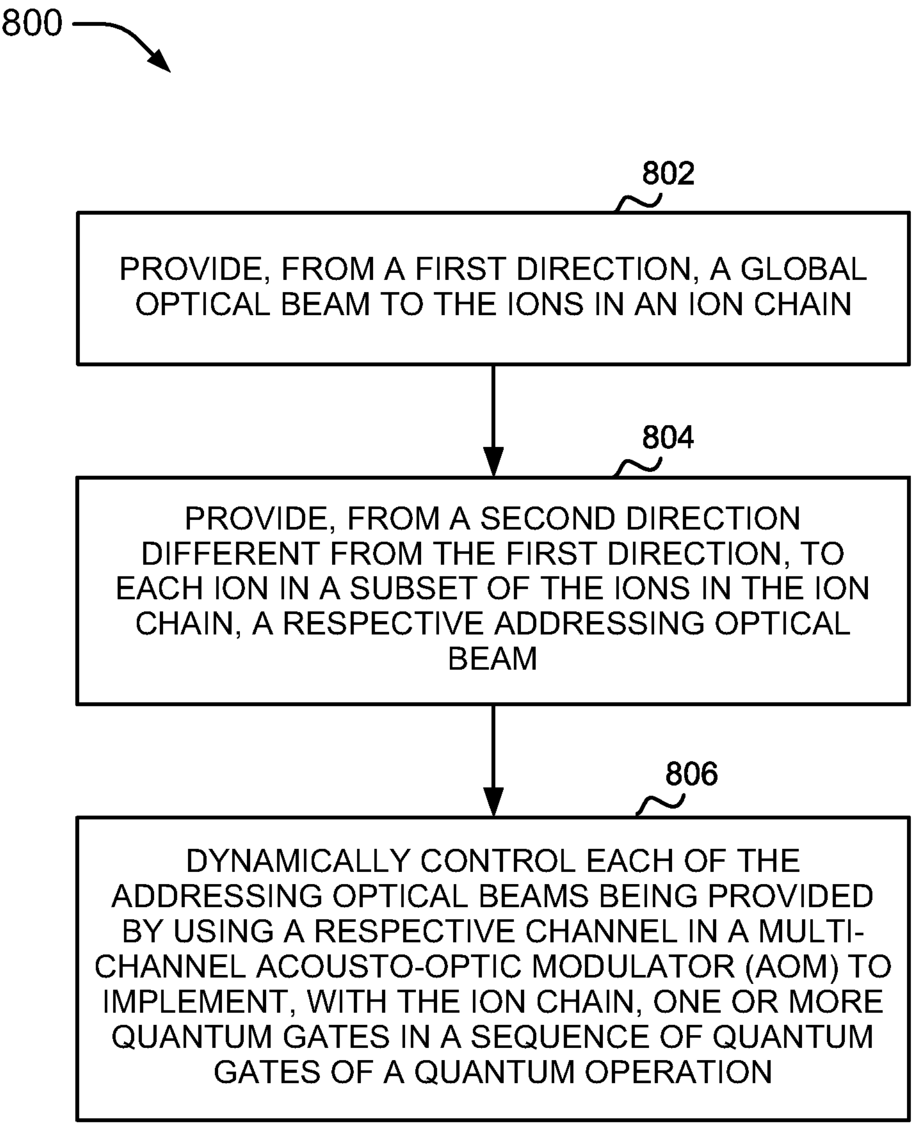
FIG. 8 is a flow diagram that illustrates an example of a method in accordance with aspects of this disclosure

Referring to FIG. 8, a method 800 of controlling quantum states of ions in an ion chain for a quantum operation. In an aspect, the method 800 may be performed in a computer system such as the computer device 600 described above, where, for example, the processor 610, the memory 620, the data store 640, and/or the operating system 660 may be used to perform the functions of the method 800. Similarly, the functions of the method 800 may be performed by one or more components of a QIP system such as the QIP system 700 and its components (e.g., optical controller 720 and its subcomponents).

At block 802, the method 800 may include providing, from a first direction, a global optical beam (e.g., global optical beam 220) to the ions in the ion chain (e.g., linear crystal 110).

At block 804, the method 800 may include providing, from a second direction different from the first direction, to each ion in a subset of the ions in the ion chain, a respective addressing optical beam (e.g., addressing optical beams 210). In one example, the second direction is opposite the first direction. In another example, the second direction is 90 degrees offset from the first direction.

At block 806, the method 800 may include dynamically controlling each of the addressing optical beams being provided by using a respective channel in a multi-channel AOM (e.g., AOM 310) to implement, with the subset of ions in the ion chain, one or more quantum gates in a sequence of quantum gates of the quantum operation (e.g., sequence of quantum gates in FIG. 5).

In an aspect of the method 800, the method further includes monitoring (e.g., by optical controller 720 and/or multi-channel AOM controller 737) an accumulated phase shift in each of the plurality of ions in the ion chain, wherein dynamically controlling each of the addressing optical beams being provided includes independently modulating each of the addressing optical beams being provided to correct for the accumulated phase shift in the respective ion.

In an aspect of the method 800, dynamically controlling each of the addressing optical beams being provided includes independently modulating each of the addressing optical beams being provided to control one or more optical beam characteristics of the respective addressing optical beam. The one or more optical beam characteristics include one or more of a frequency, a phase, or an amplitude. In some instances the polarization may also be a characteristic of the optical beams that may require some form of control. Moreover, independently modulating each of the addressing optical beams being provided includes independently modulating an RF signal that is applied to a respective channel in the AOM to modify the optical beam characteristics of the respective addressing optical beam.

In an aspect of the method 800, the sequence of quantum gates of the quantum operation includes one or more single-qubit gates, one or more two-qubit gates, or a combination thereof (see e.g., FIG. 5). For any one of the one or more single-qubit gates, a respective addressing optical beam is dynamically controlled to have a single frequency or tone to produce a spin flip. For any one of the one or more two-qubit gates, a respective addressing optical beam is dynamically controlled to have two frequencies or tones to drive motional sidebands.

In an aspect of the method 800, subsequently providing, from the second direction, to each ion in a different subset of the ions in the ion chain, a respective addressing optical beam; and dynamically controlling each of the addressing optical beams being provided to the different subset of the ions in the ion chain by using a respective channel in the multi-channel AOM to implement, with the ion chain, one or more different quantum gates in the sequence of quantum gates of the quantum operation.

In an aspect of the method 800, the global optical beam provided from the first direction and each of the addressing optical beams provided from the second direction operate as counter-propagating Raman optical beams.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects may be described or claimed in the singular, the plural is contemplated unless limitation to the singular is explicitly stated. Additionally, all or a portion of any aspect may be utilized with all or a portion of any other aspect, unless stated otherwise. Thus, the disclosure is not to be limited to the examples and designs described herein but is to be accorded the widest scope consistent with the principles and novel features disclosed herein.

What is claimed is:

1. A method of controlling quantum states of ions in an ion chain for a quantum operation to reduce errors, comprising:

trapping, via a plurality of electrodes, the ions in the ion chain;

propagating, from a first direction, a global optical beam to at least one ion in the ion chain;

propagating, from a second direction different from the first direction, respective addressing optical beams to each ion in a subset of the ions in the ion chain;

monitoring an accumulated phase shift in each of the ions in the subset of ions; and implementing one or more quantum gates for the quantum operation by independently modulating and controlling one or more of a frequency, a phase, or an amplitude of each of the addressing optical beams to correct for the accumulated phase shift in each ion associated with energy shifts of the ions.

2. The method according to claim 1, wherein the propagating of the addressing optical beams comprises propagating in the second direction that is orthogonal to the first direction.

3. The method according to claim 1, wherein the propagating of the addressing optical beams comprises propagating in the second direction that is opposite to the first direction.

4. The method according to claim 1, further comprising dynamically controlling each of the addressing optical beams being propagated by using a respective channel in a multi-channel acousto-optic modulator (AOM) to implement the one or more quantum gates in a sequence of quantum gates for the quantum operation.

5. The method according to claim 4, wherein the controlling of each of the addressing optical beam includes controlling a frequency difference or a phase difference associated with the global optical beam and each respective addressing optical beam.

6. The method according to claim 4, wherein dynamically controlling each of the addressing optical beams includes implementing a single qubit rotation before a two-qubit gate and another single qubit rotation after the two-qubit gate, such that the combination of the two qubits rotations and the two-qubit gate is insensitive to a relative optical phase of the global optical beam and the respective addressing optical beams that drive a Raman transition.

7. The method according to claim 4, wherein dynamically controlling each of the addressing optical beams being provided includes independently modulating each of the addressing optical beams being provided to control one or more optical beam characteristics of the respective addressing optical beam.

8. The method according to claim 7, wherein the one or more optical beam characteristics include one or more of a frequency, a phase, or an amplitude.

9. The method according to claim 1, wherein the one or more quantum gates includes one or more single-qubit gates, one or more two-qubit gates, or a combination thereof, and wherein the method further comprises dynamically controlling, for any one of the one or more single-qubit gates, a respective addressing optical beam to have substantially a single frequency or tone without other frequencies or tones to produce a spin flip.

10. The method according to claim 1, further comprising:

subsequently propagating, from the second direction, to each ion in a different subset of the ions in the ion chain, a respective addressing optical beam; and dynamically controlling each of the addressing optical beams being provided to the different subset of the ions in the ion chain by using a respective channel in a multi-channel AOM to implement, with the different subset of ions in the ion chain, one or more different quantum gates for the quantum operation.

11. The QIP system according to claim 1, wherein the at least one second optical source is further configured to subsequently propagate, from the second direction, to each ion in a different subset of the ions in the ion chain, a respective addressing optical beam, and wherein the controller is further configured to dynamically control each of the addressing optical beams being provided to the different subset of the ions in the ion chain by using a respective channel in a multichannel AOM to implement, with the different subset of ions in the ion chain, one or more different quantum gates for the quantum operation.

12. A quantum information processing (QIP) system controlling quantum states of ions in an ion chain for reducing errors in a quantum operation, comprising:

an ion trap configured to implement the ion chain;

a plurality of electrodes configured to trap ions in the ion chain;

a first optical source configured to propagate, from a first direction, a global optical beam to at least one ion in the ion chain;

at least one second optical source configured to propagate, from a second direction different from the first direction, respective addressing optical beams to each ion in a subset of the ions in the ion chain; and a controller configured to:

monitor an accumulated phase shift in each of the ions in the subset of ions, and implement one or more quantum gates for the quantum operation by independently modulating and controlling one or more of a frequency, a phase, or an amplitude of each of the addressing optical beams to correct for the accumulated phase shift in each ion associated with energy shifts of the ions.

13. The QIP system according to claim 12, wherein the at least one second optical source is configured to propagate the addressing optical beams in the second direction that is orthogonal to the first direction.

14. The QIP system according to claim 12, wherein the at least one second optical source is configured to propagate the addressing optical beams in the second direction that is opposite to the first direction.

15. The QIP system according to claim 12, further comprising:

a multi-channel acousto-optic modulator (AOM), wherein the controller is further configured to dynamically control each of the addressing optical beams being propagated by using a respective channel in the AOM to implement the one or more quantum gates in a sequence of quantum gates for the quantum operation.

16. The QIP system according to claim 15, wherein the controller is further configured to control each of the addressing optical beam by controlling a frequency difference or a phase difference associated with the global optical beam and each respective addressing optical beam.

17. The QIP system according to claim 15, wherein the controller is further configured to dynamically control each of the addressing optical beams by implementing a single qubit rotation before a two-qubit gate and another single qubit rotation after the two-qubit gate, such that the combination of the two qubits rotations and the two-qubit gate is insensitive to a relative optical phase of the global optical beam and the respective addressing optical beams that drive a Raman transition.

18. The QIP system according to claim 15, wherein the controller is further configured to dynamically control each of the addressing optical beams being provided by independently modulating each of the addressing optical beams being provided to control one or more optical beam characteristics of the respective addressing optical beam.

19. The QIP system according to claim 18, wherein the one or more optical beam characteristics include one or more of a frequency, a phase, or an amplitude.

20. The QIP system according to claim 12, wherein the one or more quantum gates includes one or more single-qubit gates, one or more two-qubit gates, or a combination thereof, and wherein the controller is further configured to dynamically control, for any one of the one or more single-qubit gates, a respective addressing optical beam to have substantially a single frequency or tone without other frequencies or tones to produce a spin flip.

* * * * *